US012634913B2

(12) United States Patent
Li et al.

(10) Patent No.: US 12,634,913 B2
(45) Date of Patent: May 19, 2026

(54) BEAM INDICATION METHOD AND APPARATUS, AND STORAGE MEDIUM

(71) Applicant: DATANG MOBILE COMMUNICATIONS EQUIPMENT CO.,LTD., Beijing (CN)

(72) Inventors: Hui Li, Beijing (CN); Qiubin Gao, Beijing (CN); Runhua Chen, Beijing (CN); Yajuan Luo, Beijing (CN); Lei Song, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 313 days.

(21) Appl. No.: 18/262,000

(22) PCT Filed: Dec. 24, 2021

(86) PCT No.: PCT/CN2021/141182
§ 371 (c)(1),
(2) Date: Jul. 18, 2023

(87) PCT Pub. No.: WO2022/151953
PCT Pub. Date: Jul. 21, 2022

(65) Prior Publication Data
US 2024/0306136 A1 Sep. 12, 2024

(30) Foreign Application Priority Data

Jan. 18, 2021 (CN) .......................... 202110063049.1
Mar. 30, 2021 (CN) .......................... 202110343337.2

(51) Int. Cl.
*H04W 72/044* (2023.01)
*H04L 5/00* (2006.01)
*H04W 72/232* (2023.01)

(52) U.S. Cl.
CPC ......... *H04W 72/046* (2013.01); *H04L 5/0053* (2013.01); *H04W 72/232* (2023.01)

(58) Field of Classification Search
None
See application file for complete search history.

(56) References Cited

U.S. PATENT DOCUMENTS

2020/0007208 A1 1/2020 Zhou et al.
2020/0351841 A1 11/2020 Cirik et al.
(Continued)

FOREIGN PATENT DOCUMENTS

CN 109391460 A 2/2019
CN 111586846 A 8/2020
(Continued)

OTHER PUBLICATIONS

The extended European search report received in the counterpart European Application 21919140.0, mailed on Dec. 3, 2024.
(Continued)

*Primary Examiner* — Phirin Sam
(74) *Attorney, Agent, or Firm* — KILPATRICK TOWNSEND & STOCKTON LLP

(57) ABSTRACT

Provided are a beam indication method and apparatus, and a storage medium. The method includes receiving downlink control information, and determining a target transmission configuration indicator (TCI) state group on the basis of the downlink control information, wherein the target TCI state group is used for representing a channel and/or link to which the target TCI state group is applied; and sending and receiving a signal on the basis of a beam corresponding to the target TCI state group. The beam indication method and apparatus, and the storage medium provided in the present disclosure, identification or indication information of a channel and/or link is introduced into a TCI state group, and (Continued)

receiving downlink control information, determining a target transmission configuration indicator (TCI) state group based on the downlink control information, where the target TCI state group is used to characterize an applied channel and/or link —— 100 performing signal transmission and reception based on beams corresponding to the target TCI state group —— 101 a channel and/or link, to which the TCI state group corresponding to each code point is applied, are/is determined, and corresponding beam information is indicated by a code point and on the basis of downlink control information.

20 Claims, 2 Drawing Sheets

(56) References Cited

U.S. PATENT DOCUMENTS

| | | | | |
|---|---|---|---|---|
| 2021/0014931 A1 | | 1/2021 | Noh et al. | |
| 2021/0219336 A1* | | 7/2021 | Fan | H04W 74/006 |
| 2021/0385803 A1* | | 12/2021 | Shi | H04W 48/08 |
| 2022/0061069 A1* | | 2/2022 | Yang | H04W 72/232 |
| 2022/0078772 A1* | | 3/2022 | Chen | H04L 1/0031 |
| 2023/0216565 A1* | | 7/2023 | Kwak | H04B 7/0696 |
| | | | | 375/267 |
| 2024/0188063 A1* | | 6/2024 | Li | H04B 7/06966 |
| 2024/0340711 A1* | | 10/2024 | Zhang | H04W 36/0058 |

FOREIGN PATENT DOCUMENTS

| | | |
|---|---|---|
| CN | 111586862 A | 8/2020 |
| WO | 2020157703 A1 | 8/2020 |
| WO | 2020164601 A1 | 8/2020 |
| WO | 2020227139 A1 | 11/2020 |
| WO | 2021003620 A1 | 1/2021 |

OTHER PUBLICATIONS

Moderator (Samsung), "Moderator summary#2 for multi-beam enhancement: proposal categorization", 3GPP TSG RAN WG1 #102-e, e-Meeting, Aug. 17-28, 2020, total 27 pages, R1-2007189.

International Search Report received in corresponding international application PCT/CN2021/141182, Mar. 14, 2022.

The first search report received in the counterpart CN Application 202110343337.2, mailed on Dec. 18, 2024.

The Examination report No. 1 received in counterpart Australian application 2021418673, mailed on Mar. 25, 2024.

The Examination report No. 2 received in counterpart Australian application 2021418673, mailed on Jan. 18, 2025.

* cited by examiner

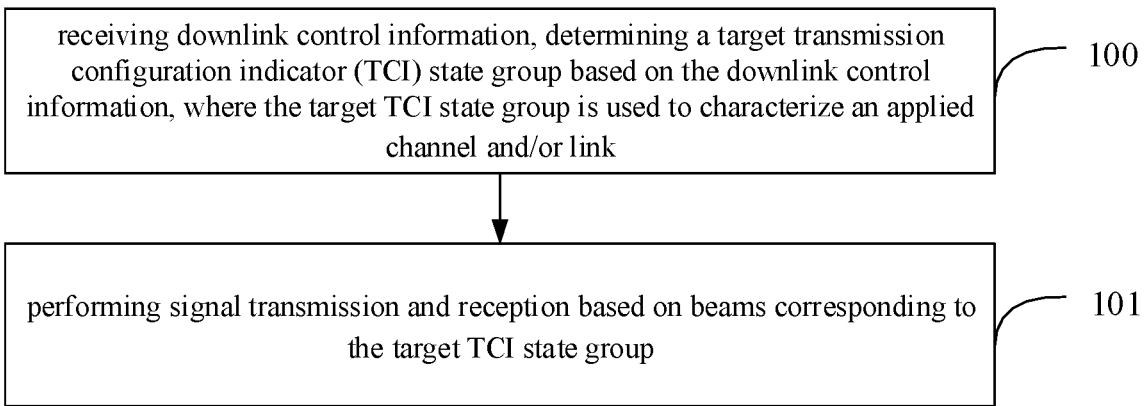

receiving downlink control information, determining a target transmission configuration indicator (TCI) state group based on the downlink control information, where the target TCI state group is used to characterize an applied channel and/or link — 100 performing signal transmission and reception based on beams corresponding to the target TCI state group — 101

FIG. 1 transmitting downlink control information to a user equipment (UE), where the downlink control information is used for determining a target transmission configuration indicator (TCI) state group, and the target TCI state group is used to characterize an applied channel and/or a link — 200 performing signal transmission and reception based on beams corresponding to the target TCI state group — 201

FIG. 2

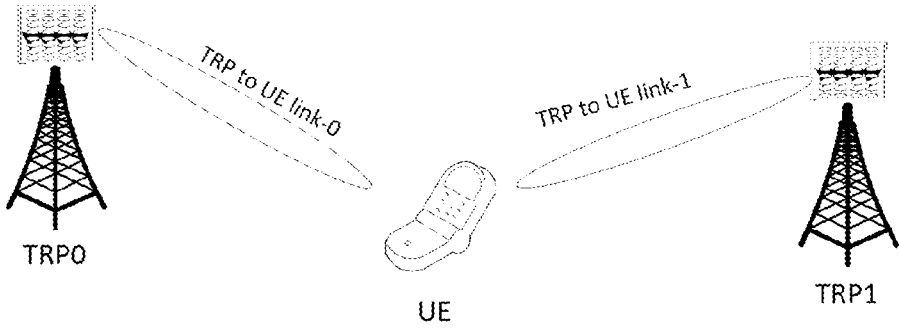

TRP0    TRP to UE link-0    TRP to UE link-1    TRP1

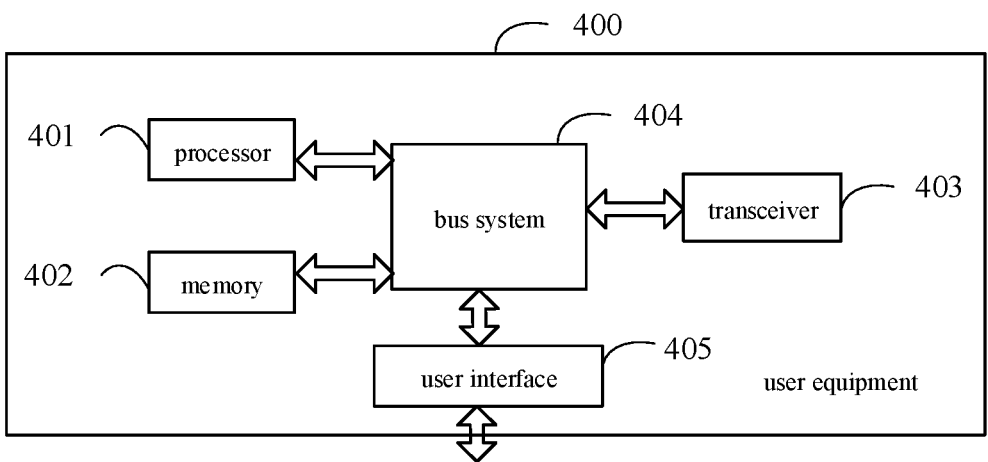
FIG. 4
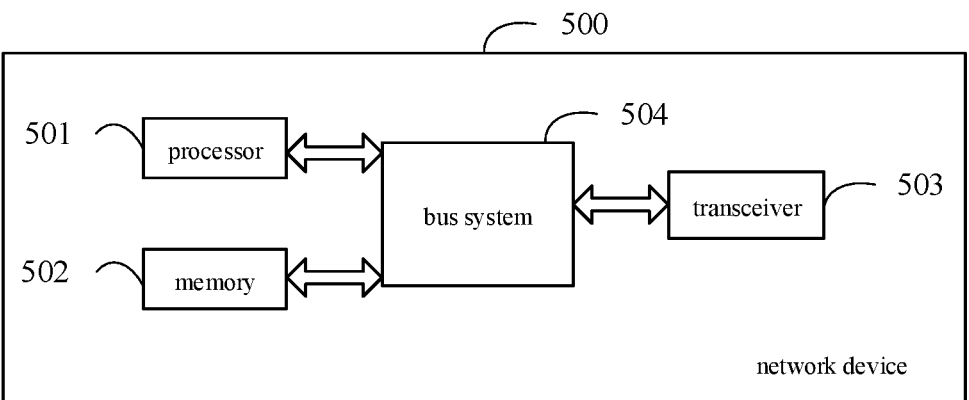
FIG. 5
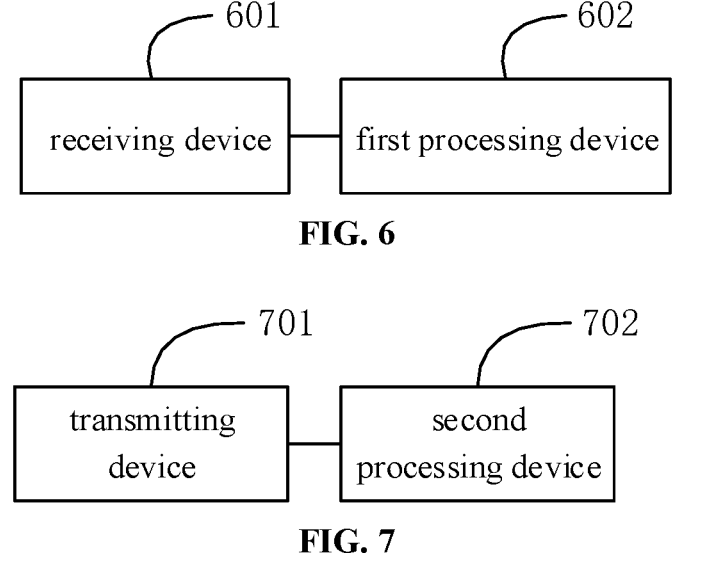
FIG. 6
FIG. 7

BEAM INDICATION METHOD AND APPARATUS, AND STORAGE MEDIUM

CROSS-REFERENCE TO RELATED APPLICATION

The present application is a National Stage of International Application No. PCT/CN2021/141182, filed on Dec. 24, 2021, which claims priority to Chinese Patent Application No. 202110063049.1 filed on Jan. 18, 2021, entitled "Beam Indication Method and Apparatus, and Storage Medium", and Chinese Patent Application No. 202110343337.2 filed on Mar. 30, 2021, entitled "Beam Indication Method and Apparatus, and Storage Medium", which are hereby incorporated by reference in its entireties.

FIELD

The present application relates to the field of communication technologies, and in particular, to beam indication methods and devices, and a storage medium.

BACKGROUND

In a new radio (NR) system, downlink channels include a downlink data channel physical downlink shared channel (PDSCH), a physical downlink control channel (PDCCH), and uplink channels include an uplink data channel physical uplink shared channel (PUSCH), and an uplink control channel physical uplink control channel (PUCCH). For high-frequency transmission (frequency range 2 (FR2) in NR), due to a limited transmission range, the uplink and downlink channels are usually transmitted after beamforming to enhance coverage. The direction of beamforming can be determined by beam sweeping of uplink and downlink reference signals.

In the current NR protocol, different channels use different beam indication signaling, and beam indication is performed independently for each channel. As such, different channels may be transmitted using respective different beams. An important scenario in practical applications is that multiple channels are transmitted using the same beam direction. For example, the PDCCH for resource scheduling and the PDSCH for transmitting user data are transmitted using the same beam direction; and PUCCH and PUSCH are also transmitted using the same beam direction. When beam reciprocity exists, the uplink and downlink channels can also use the same beam direction. The current independent beam indication mode increases system complexity and signaling indication overhead. In order to overcome the above problems, in the NR Rel-17 protocol, a method of indicating multiple channel beams using beam indication signaling is introduced, a group of transmission configuration indicator (TCI) states are activated through medium access control-control element (MAC-CE), and then downlink control information (DCI) is used to indicate the state of one of the activated TCIs.

When the uplink and downlink channels are reciprocal, the beam indicated by the beam indication signaling can be used for both the uplink channels and the downlink channels. In case that a problem of maximum permissible exposure (MPE) occurs due to human body occlusion or the terminal needs to switch an uplink beam, the uplink channel will use a beam different from that of the downlink channel, and the beam indication signaling needs to indicate an uplink channel beam and a downlink channel beam respectively. There is no solution in the related art about how to use beam indication signaling to distinguish the above different application scenarios.

SUMMARY

In view of the problems above, embodiments of the present application provide beam indication methods and devices and a storage medium.

An embodiment of the present application provides a beam indication method, applied to a user equipment (UE), including:

receiving downlink control information, determining a target transmission configuration indicator (TCI) state group based on the downlink control information, where the target TCI state group is used to characterize an applied channel and/or link; and performing signal transmission and reception based on beams corresponding to the target TCI state group.

In an embodiment, the determining the TCI state group based on the downlink control information, where the target TCI state group is used to characterize an applied channel and/or link, includes:

determining a target TCI state group based on the downlink control information, where the target TCI state group includes at least one information field, and the information field includes an uplink beam indication information field, a downlink beam indication information field, and an uplink and downlink shared beam indication information field, an uplink power control information field, a carrier set information field, and a channel indication information field; the uplink power control information field is used to indicate an uplink power control parameter or a parameter set corresponding to the TCI state for uplink transmission; the carrier set information field is used to indicate one or more carriers applied by the TCI state group; and the channel indication information field is used to indicate one or more channels applied by the TCI state group.

In an embodiment, the information field further includes: a transmission reception point (TRP) indication information field.

In an embodiment, the target TCI state group further includes cell ID information.

In an embodiment, before receiving the downlink control information, the method further includes:

receiving a control signaling transmitted from a network device, where the control signaling is used to activate at least one TCI state group, and the at least one activated TCI state group includes the target TCI state group.

In an embodiment, the control signaling further includes: information for indicating whether an information field included in each of the at least one activated TCI state group is valid.

In an embodiment, the control signaling further includes: indication formation for information field usage indicator included in each of the at least one activated TCI state group.

In an embodiment, the indication formation for information field usage indicator is independent information field usage indication information associated with each activated TCI state group, or all activated TCI state groups are associated with the same information field usage indication information.

In an embodiment, the indication formation for information field usage indicator is used to indicate an uplink and downlink shared state or an uplink and downlink separated state.

In an embodiment, the determining the TCI state group based on the downlink control information, where the target TCI state group is used to characterize an applied channel and/or link, includes:

determining a target transmission configuration indicator (TCI) state group based on the downlink control information and a predefined relationship, where the predefined relationship is a correspondence relationship between at least one TCI state group and a channel and/or link predetermined by a system.

In an embodiment, before receiving the downlink control information, the method further includes:

receiving a control signaling transmitted from a network device, where the control signaling is used to activate at least one TCI state group, and the at least one activated TCI state group includes the target TCI state group.

In an embodiment, the downlink control information is DCI signaling; a code point indicated by the DCI signaling corresponds to the target TCI state group included in at least one TCI state group activated by the control signaling.

An embodiment of the present application provides a beam indication method, applied to a network device, including:

transmitting downlink control information to a user equipment (UE), where the downlink control information is used by the UE for determining a target transmission configuration indicator (TCI) state group, and the target TCI state group is used to characterize an applied channel and/or link; and performing signal transmission and reception based on beams corresponding to the target TCI state group.

In an embodiment, the determining the TCI state group, where the target TCI state group is used to characterize an applied channel and/or link, includes:

determining a target TCI state group based on the downlink control information, where the target TCI state group includes at least one information field, and the information field includes an uplink beam indication information field, a downlink beam indication information field, and an uplink and downlink shared beam indication information field, an uplink power control information field, a carrier set information field, and a channel indication information field; the uplink power control information field is used to indicate an uplink power control parameter or a parameter set corresponding to the TCI state for uplink transmission; the carrier set information field is used to indicate one or more carriers applied by the TCI state group; and the channel indication information field is used to indicate one or more channels applied by the TCI state group.

In an embodiment, the information field further includes: a transmission reception point (TRP) indication information field.

In an embodiment, the target TCI state group further includes cell ID information.

In an embodiment, before transmitting the downlink control information to the user equipment (UE), the method further includes:

transmitting a control signaling to the UE, where the control signaling is used to activate at least one TCI state group, and the at least one activated TCI state group includes the target TCI state group.

In an embodiment, the control signaling further includes: information for indicating whether an information field included in each of the at least one activated TCI state group is valid.

In an embodiment, the control signaling further includes: indication formation for information field usage indicator included in each of the at least one activated TCI state group.

In an embodiment, the indication formation for information field usage indicator is independent information field usage indication information associated with each activated TCI state group, or all activated TCI state groups are associated with the same information field usage indication information.

In an embodiment, the indication formation for information field usage indicator is used to indicate an uplink and downlink shared state or an uplink and downlink separated state.

In an embodiment, the determining the TCI state group, where the target TCI state group is used to characterize an applied channel and/or link, includes:

determining a target transmission configuration indicator (TCI) state group based on the downlink control information and a predefined relationship, where the predefined relationship is a correspondence relationship between at least one TCI state group and a channel and/or link predetermined by a system.

In an embodiment, before receiving the downlink control information, the method further includes:

transmitting a control signaling to the UE, where the control signaling is used to activate at least one TCI state group, and the at least one activated TCI state group includes the target TCI state group.

In an embodiment, the downlink control information is DCI signaling; a code point indicated by the DCI signaling corresponds to the target TCI state group included in at least one TCI state group activated by the control signaling.

An embodiment of the present application provides a user equipment (UE), including:

a processor;

a memory for storing a computer program; and a transceiver for transmitting and receiving data under the control of the processor, where the computer programs, when executed by the processor, causes the UE to perform the steps of the beam indication method described above.

According to an embodiment of the present application, a network device is further provided, including;

a processor;

a memory for storing a computer program; and a transceiver for transmitting and receiving data under the control of the processor, where the computer programs, when executed by the processor, causes the UE to perform the steps of the beam indication method described above.

An embodiment of the present application further provides a computer readable storage medium having a computer program stored thereon that cause a processor to execute the steps of the beam indication methods described above.

In the beam indication methods and devices, and the storage medium according to the embodiments of the present application, by introducing identification or indication information of the channel and/or link into the TCI state group, channels and/or links applied by the TCI state group corresponding to each code point are determined, beam information is further indicated through code points based on downlink control information to be applicable to various application scenarios and utilization rate of resources is improved.

BRIEF DESCRIPTION OF THE DRAWINGS

In order to more clearly illustrate the solutions disclosed in the embodiments of the present disclosure or the related art, the drawings used in the descriptions of the embodiments or the related art will be briefly described below.

FIG. 1 is a first schematic flowchart of a beam indication method according to an embodiment of the present application;

FIG. 2 is a second schematic flowchart of a beam indication method according to an embodiment of the present application;

FIG. 3 is a schematic diagram for a multi-transmission reception point (TRP) transmission scenario according to an embodiment of the present application;

FIG. 4 is a schematic structural diagram of a user equipment (UE) according to an embodiment of the present application.

FIG. 5 is a schematic structural diagram of a network device according to an embodiment of the present application.

FIG. 6 is a first schematic structural diagram of a beam indication device according to an embodiment of the present application; and FIG. 7 is a second schematic structural diagram of a beam indication device according to an embodiment of the present application.

DETAILED DESCRIPTION

In the embodiments of the present application, the term "and/or" describes a related relationship of associated objects, and indicates that there can be three kinds of relationships. For example, A and/or B can represent that A exists alone, A and B exist simultaneously, and B exists alone. Character "/" generally indicates that the associated objects have an "or" relationship.

In the embodiments of the present application, the term "multiple" refers to two or more than two, and other quantifiers are similar.

The solutions in the embodiments of the present application are clearly and completely described in the following with reference to the accompanying drawings in the embodiments of the present application. These embodiments are only a part of the embodiments of the present application, and not all of the embodiments.

In a new radio (NR) system, downlink channels include a downlink data channel physical downlink shared channel (PDSCH), a downlink control channel physical downlink control channel (PDCCH), and uplink channels include an uplink data channel physical uplink shared channel (PUSCH), and an uplink control channel physical uplink control channel (PUCCH). For high-frequency transmission (frequency range 2 (FR2) in NR), due to a limited transmission range, the uplink and downlink channels are usually transmitted after beamforming to enhance coverage. The direction of beamforming can be determined by beam sweeping of uplink and downlink reference signals. For example, beam sweeping is performed using channel state information reference signal (CSI-RS) or uplink sounding reference signal (SRS) in different directions, and the direction of the reference signals with the best beam quality is selected for uplink or downlink transmission. After the beam direction of different channels is determined, it is necessary to use signaling to indicate the beam during channel transmission, that is, beam indication.

In the NR Rel-15/16 protocol, for the PUCCH, the base station semi-statically configures multiple beam directions for the terminal through a higher layer signaling SpatialRelationInfo, and indicates to activate one of the multiple beam directions through a medium access control layer control element (MAC-CE). For the PUSCH, the uplink beam selected by the base station is indirectly indicated by the SpatialRelationInfo for a SRS resource indicated by an SRS resource indicator (SRI) field in the dynamic signaling downlink control information (DCI). For the PDCCH, the base station configures multiple TCI states for each control resource set (CORESET) through a higher layer signaling, and indicates to activate one of the multiple TCI states through the MAC-CE. For the PDSCH, the base station indicates a TCI state through a TCI field in the DCI signaling, which represents a beam direction for the PDSCH.

Different channels use different beam indication signaling, and beam indication is performed independently for each channel. As such, different channels may be transmitted using respective different beams. An important scenario in practical applications is that multiple channels are transmitted using the same beam direction. For example, the PDCCH for resource scheduling and the PDSCH for transmitting user data are transmitted using the same beam direction; and PUCCH and PUSCH are also transmitted using the same beam direction. When beam reciprocity exists, the uplink and downlink channel can also use the same beam direction. The current independent beam indication mode increases system complexity and signaling indication overhead. In order to overcome the above problems, in the NR Rel-17 protocol, a method of indicating multiple channel beams using beam indication signaling is introduced, a group of TCI states are activated through MAC-CE, and then DCI is used to indicate the state of one of the activated TCIs.

When the uplink and downlink channels are reciprocal, the beam indicated by the beam indication signaling can be used for both the uplink channels and the downlink channels. In case that a problem of maximum permissible exposure (MPE) occurs due to human body occlusion or the terminal needs to switch an uplink beam, the uplink channel will use a beam different from that of the downlink channel, and the beam indication signaling needs to indicate an uplink channel beam and a downlink channel beam respectively. When multi-transmission reception point (TRP) transmission is indicated, the beam indication signaling needs to indicate beams of different TRPs (corresponding to different links). Various embodiments of the present application provide solutions for the above different application scenarios.

The solutions according to the embodiments of the present application may be applicable to various systems, especially 5G systems. For example, applicable systems may be a global system of mobile communication (GSM) system, a code division multiple access (CDMA) system, a wideband code division multiple access (WCDMA) general packet wireless service (general packet radio service, GPRS) system, a long term evolution (LTE) system, a LTE frequency division duplex (FDD) system, a LTE time division duplex (TDD) system, a long term evolution advanced (LTE-A) system, a universal mobile telecommunication system (UMTS), a worldwide interoperability for microwave access (WiMAX) system, a 5G New Radio (NR) system, etc. These various systems include a terminal and a network device. The system may further include a core network part, such as an evolved packet system (EPS), a 5G system (5GS), and the like.

The terminal device (for example, a user equipment) in the embodiments of the present application may be a device that provides voice and/or data connectivity to a user, a handheld device with a wireless connection function, or other processing device connected to a wireless modem. In different systems, the names of the terminal may be different. For example, in the 5G system, the terminal may be called as a user equipment (UE). A wireless terminal can communicate with one or more core networks (CN) via a radio access network (RAN), and the wireless terminal can be a mobile terminal, such as a mobile phone (or "cellular" phone) and computers with mobile terminal, e.g., a portable mobile device, a pocket-sized mobile device, a hand-held mobile device, a computer-built mobile device or a vehicle-mounted mobile device, which exchange language and/or data with the radio access network. For example, a personal communication service (PCS) phone, a radio phone, a session-initiated protocol (SIP) phone, a wireless local loop (WLL) station, a personal digital assistant (PDA) and other devices. A wireless terminal device may also be called a system, a subscriber unit, a subscriber station, a mobile station, a mobile, a remote station, an access point, a remote terminal, an access terminal, a user terminal, a user agent, and a user device, which are not limited in the embodiments of the present application.

The network device involved in the embodiments of the present application may be a base station, and the base station may include multiple cells providing services for the terminal. Depending on the specific application, the network side device may also be called an access point, or may be a device in the access network that communicates with wireless terminal through one or more sectors on the air interface, or other names. Network device can be used to exchange received air frames with Internet Protocol (IP) packets, and act as a router between wireless terminal and the rest of the access network, and the rest of the access network can include an Internet protocol (IP) communication network. The network devices may also coordinate attribute management for the air interface. For example, the network device in the embodiments of the present application may be a base transceiver station (BTS) in a global system for mobile communications (GSM) or a code division multiple access (CDMA), may also be a node B in a wide-band code division multiple access (WCDMA), may also be an evolutional node B (eNB or e-Node B) in a long term evolution (LTE) system, a 5G base station (gNB) in 5G network architecture (next generation system), may also be a Home evolved Node B (HeNB), a relay node (relay node), a femto, a pico base station (pico), etc., which are not limited in the embodiments of the present application. In some network structures, a network device may include a centralized unit (CU) node and a distributed unit (DU) node, and the centralized unit and the distributed unit may also be geographically separated.

FIG. 1 is a first schematic flowchart of a beam indication method according to an embodiment of the present application. The method can be applied to a user equipment (UE). As shown in FIG. 1, the method includes at least the following steps.

In step 100, downlink control information is received, a target transmission configuration indicator (TCI) state group is determined based on the downlink control information, where the target TCI state group is used to characterize an applied channel and/or link.

The UE receives the downlink control information (for example, DCI) transmitted from a network device (for example, a gNB) and determines, based on the DCI information, the target TCI state group indicated by the DCI from previously activated N TCI state groups, where N is equal to 1 or N is greater than 1.

In an embodiment, the gNB first configures a TCI state pool including multiple TCI-States for the UE, and in the TCI state pool, each state may be indicated by a TCI-StateId corresponding to each state. For example, a first TCI state is indicated by TCI-State0, a second TCI state is indicated by TCI-State1, and so on. Each TCI-StateId corresponds to a beam.

The gNB may activate at least one state group in the TCI state pool by transmitting an activation command n to the UE. The activation command may be an MAC-CE signaling, the state group includes at least one state, and each state group may be used to characterize an applied channel and/or a link. The target state group includes at least one state, and each state is indicated by a TCI-StateId corresponding to each state, and each TCI-StateId corresponds to a beam, the applied channel and/or link can be characterized, for example, an uplink channel or a downlink channel is applied, etc.

In step 101, signal transmission and reception is performed based on beams corresponding to the target TCI state group.

After the UE receives the MAC-CE signaling transmitted from the gNB, and then receives the DCI transmitted from the gNB, where the MAC-CE signaling is used to activate N TCI state groups. A code point indicated by the DCI corresponds to a TCI state group activated by the MAC-CE signaling. The UE can perform signal transmission and reception based on beams corresponding to the target TCI state group.

In the beam indication methods according to the embodiments of the present application, by introducing identification or indication information of the channel and/or link into the TCI state group, channels and/or links applied by the TCI state group corresponding to each code point are determined, beam information is further indicated through code points based on downlink control information to be applicable to various application scenarios and utilization rate of resources is improved.

On the basis of the above embodiments, the target transmission configuration indicator (TCI) state group is determined based on the downlink control information, where the target TCI state group is used to characterize the applied channel and/or the link, which can be implemented in a variety of modes including mode 1 and mode 2.

In mode 1, the target transmission configuration indicator (TCI) state group is determined based on the downlink control information. The target TCI state group includes at least one information field, and the information field includes an uplink beam indication information field, a downlink beam indication information field, and an uplink and downlink shared beam indication information field, an uplink power control information field, a carrier set information field, and a channel indication information field, where the uplink power control information field is used to indicate an uplink power control parameter or a parameter set corresponding to the TCI state for uplink transmission; the carrier set information field is used to indicate one or more carriers applied by the TCI state group; and the channel indication information field is used to indicate one or more channels applied by the TCI state group.

In an embodiment, the uplink power control information field included in the information field is used to indicate an uplink power control parameter or a parameter set corresponding to the TCI state for uplink transmission.

For example, a target TCI state group as shown in a Table 1 includes two information fields.

TABLE 1

| Only for downlink transmission or uplink and downlink combination transmission | Only for uplink transmission |
|---|---|
| TCI-StateId | TCI-StateId |

In an embodiment, the information field further includes: a transmission reception point (TRP) indication information field. For example, another target TCI state group shown in Table 2 includes four information fields. By adding the TRP indicator information field, flexible uplink and downlink beam indication and dynamic handover between multi-TRP and single-TRP can be implemented.

TABLE 2

| Only for TRP0 downlink transmission or TRP0 uplink and downlink combination transmission | Only for TRP0 uplink transmission | Only for TRP1 downlink transmission or TRP1 uplink and downlink combination transmission | Only for TRP1 uplink transmission |
|---|---|---|---|
| TCI-StateId | TCI-StateId | TCI-StateId | TCI-StateId |

In an embodiment, the target TCI state group may further include cell ID information for indicating the TCI state is used for which cell, such as a serving cell or other secondary cells.

As mentioned above, the UE receives a control signaling (for example, MAC-CE) transmitted from the gNB, where the MAC-CE is used to activate at least one TCI state group, and the at least one activated TCI state group includes the target TCI state group.

In an embodiment, the MAC-CE further includes: information for indicating whether an information field included in each of the at least one activated TCI state group is valid. For example, for each information field in Table 1, 1 bit information may be used to indicate whether the information field exists or is valid.

In an embodiment, the MAC-CE further includes: indication formation for information field usage indicator included in each of the at least one activated TCI state group. For example, the information field "only for downlink transmission or uplink and downlink combination transmission" has two meanings. When only the information field exists in Table 1, a 1-bit information field is additionally used to indicate its meaning. For example, an information field usage indication bit is indicated as '1', it means that this information field is only used for downlink transmission. When Table 1 includes not only this information field but also other information fields, for example, in case that Table 1 further includes the "only for uplink transmission" information field, it can be defaulted that the meaning of the "only for downlink transmission or uplink and downlink combination transmission" information field is only used for downlink transmission and does not require an additional indication formation for information field usage indicator.

In an embodiment, the indication formation for information field usage indicator is independent information field usage indication information associated with each activated TCI state group, or all activated TCI state groups are associated with the same information field usage indication information.

In an embodiment, the indication formation for information field usage indicator is used to indicate an uplink and downlink shared state or an uplink and downlink separated state.

In mode 2, a target transmission configuration indicator (TCI) state group is determined based on the downlink control information and a predefined relationship, where the predefined relationship is a correspondence relationship between at least one TCI state group and a channel and/or link predetermined by a system. In an embodiment, the system predefines correspondence relationships between N TCI state groups and a channel and/or link.

Similarly, the UE receives a control signaling (for example, MAC-CE) transmitted from the gNB, where the MAC-CE is used to activate at least one TCI state group, and the at least one activated TCI state group includes the target TCI state group. For example, the gNB transmits MAC-CE signaling to the UE, and the MAC-CE signaling is used to activate N=8 states, as shown in Table 3.

TABLE 3

| Code points | Activated TCI state |
|---|---|
| 000 | TCI-State3 |
| 001 | TCI-State9 |
| 010 | TCI-State18 |
| 011 | TCI-State25 |
| 100 | TCI-State36 |
| 101 | TCI-State7 |
| 110 | TCI-State100 |
| 111 | TCI-State88 |

The gNB transmits the DCI signaling to the UE, where the code point indicated by the DCI signaling corresponds to the target TCI state group included in at least one TCI state group activated by the control signaling. In an embodiment, the system predefines that the first 4 code points correspond to the TRP0 transmission beams, and the last 4 code points correspond to TRP1 transmission beams. In case that the DCI transmitted from TRP0 indicates code point '101', TRP1 will perform data transmission using the beam corresponding to TCI-State7. In case that the DCI transmitted from TRP1 indicates code point '000', TRP0 will perform data transmission using the beam corresponding to TCI-State3. In case that the DCI transmitted from TRP1 indicates code point '110', TRP1 will perform data transmission using the beam corresponding to TCI-State100.

FIG. 2 is a second schematic flowchart of a beam indication method according to an embodiment of the present application. The method can be applied to a network device (for example, a gNB). As shown in FIG. 2, the method includes at least the following steps.

In step 200, downlink control information is transmitted to a user equipment (UE), where the downlink control information is used by the UE for determining a target transmission configuration indicator (TCI) state group, and the target TCI state group is used to characterize an applied channel and/or link.

The gNB transmits downlink control information (DCI) to the UE and determines, and the UE determines, based on the DCI information, the target TCI state group indicated by the DCI from previously activated N TCI state groups, where N is equal to 1 or N is greater than 1.

In an embodiment, the gNB first configures a TCI state pool including multiple TCI-States for the UE, and in the TCI state pool, each state may be indicated by a TCI-StateId corresponding to each state. For example, a first TCI state is indicated by TCI-State0, a second TCI state is indicated by TCI-State1, and so on; and each TCI-StateId corresponds to a beam.

The gNB may activate at least one state group in the TCI state pool by transmitting an activation command n to the UE. The activation command may be an MAC-CE signaling, the state group includes at least one state, and each state group may be used to characterize an applied channel and/or link. The target state group includes at least one state, and each state is indicated by a TCI-StateId corresponding to each state. Each TCI-StateId corresponds to a beam, and then the applied channel and/or link can be characterized, for example, the applied channel is an uplink channel or a downlink channel, etc.

In step 201, signal transmission and reception is performed based on beams corresponding to the target TCI state group.

After the gNB transmits the MAC-CE signaling to the UE, and then transmits the DCI to the UE, where the MAC-CE signaling is used to activate N TCI state groups. A code point indicated by the DCI corresponds to a TCI state group activated by the MAC-CE signaling. The UE can perform signal transmission and reception based on beams corresponding to the target TCI state group and the gNB can perform signal transmission and reception based on beams corresponding to the target TCI state group In the beam indication methods according to the embodiments of the present application, by introducing identification or indication information of the channel and/or link into the TCI state group, channels and/or links applied by the TCI state group corresponding to each code point are determined, beam information is further indicated through code points based on downlink control information to be applicable to various application scenarios and utilization rate of resources is improved.

On the basis of the above embodiments, the target transmission configuration indicator (TCI) state group is determined based on the downlink control information, where the target TCI state group is used to characterize the applied channel and/or the link, which can be implemented in a variety of modes including mode 1 and mode 2.

In the mode 1, the target transmission configuration indicator (TCI) state group is determined based on the downlink control information. The target TCI state group includes at least one information field, and the information field includes an uplink beam indication information field, a downlink beam indication information field, and an uplink and downlink shared beam indication information field, an uplink power control information field, a carrier set information field, and a channel indication information field, where the uplink power control information field is used to indicate an uplink power control parameter or a parameter set corresponding to the TCI state for uplink transmission; the carrier set information field is used to indicate one or more carriers applied by the TCI state group; and the channel indication information field is used to indicate one or more channels applied by the TCI state group.

In an embodiment, the uplink power control information field included in the information field is used to indicate an uplink power control parameter or a parameter set corresponding to the TCI state for uplink transmission, as shown in Table 1.

In an embodiment, the information field further includes: a transmission reception point (TRP) indication information field, as shown in Table 2.

In an embodiment, the target TCI state group may further include cell ID information for indicating the TCI state is used for which cell, such as a serving cell or other secondary cells.

As described above, before the gNB transmits the downlink control information to the UE, the method further includes: transmitting a control signaling (MAC-CE) to the UE, where the control signaling is used to activate at least one TCI state group, and the at least one activated TCI state group includes the target TCI state group.

In an embodiment, the MAC-CE further includes: information for indicating whether an information field included in each of the at least one activated TCI state group is valid. For example, for each information field in Table 1, 1 bit information may be used to indicate whether the information field exists or is valid.

In an embodiment, the MAC-CE further includes: indication formation for information field usage indicator included in each of the at least one activated TCI state group.

In an embodiment, the indication formation for information field usage indicator is independent information field usage indication information associated with each activated TCI state group, or all activated TCI state groups are associated with the same information field usage indication information.

In an embodiment, the indication formation for information field usage indicator is used to indicate the uplink and downlink shared state or the uplink and downlink separated state.

In the mode 2, a target transmission configuration indicator (TCI) state group is determined based on the downlink control information and a predefined relationship, where the predefined relationship is a correspondence relationship between at least one TCI state group and a channel and/or link predetermined by a system. In an embodiment, the system predefines correspondence relationships between N TCI state groups and a channel and/or link.

Similarly, the gNB needs to transmit a control signaling (such as MAC-CE) to the UE, where the MAC-CE is used to activate at least one TCI state group, and the at least one activated TCI state group includes the target TCI state group. Further, the gNB transmits the DCI signaling to the UE, where the code point indicated by the DCI signaling corresponds to the target TCI state group included in at least one TCI state group activated by the control signaling. For details, the above description about Table 3 may be referred.

In the beam indication method according to the embodiments of the present application, by introducing identification or indication information of the channel and/or link into a signaling activating TCI states, channels and/or links applied by the TCI state group corresponding to each code point are determined, beam information is further indicated through code points based on downlink control information to be applicable to various application scenarios and utilization rate of resources is improved.

The above mode 1 will be further described below in combination with several examples.

Example 1

It is assumed that the base station configures a TCI state pool including S=128 TCI-States for the UE. Each state is indicated by a TCI-StateId. For example, a first TCI state is indicated by TCI-State0, a second TCI state is indicated by TCI-State1, and so on.

The gNB transmits MAC-CE signaling to the UE, and the MAC-CE signaling is used to activate N=8 states. For each state group, the following basic information fields are included.

| Only for downlink transmission or uplink and downlink combination transmission | Only for uplink transmission |
|---|---|
| TCI-StateId | TCI-StateId |

For each information field, 1 bit information is used to indicate whether the information field exists or is valid. Further, in case that only the first information field exists, an additional 1-bit information field usage indication is used to distinguish the usage of the first information field, that is, whether it is only used for downlink transmission or uplink and downlink combination transmission.

For example, for a state group 1, the information field corresponding to the state group 1 is expressed as the following.

| Only for downlink transmission or uplink and downlink combination transmission | Only for uplink transmission |
|---|---|
| TCI-State0 | TCI-State6 |

The bits corresponding to each information field are set to '1', indicating that both information fields are valid. As such, the state group indicates that the beam corresponding to TCI-State0 is used for downlink transmission, and the beam corresponding to TCI-State6 is used for uplink transmission.

For a state group 2, the information field corresponding to the state group 2 is expressed as:

| Only for downlink transmission or uplink and downlink combination transmission | Only for uplink transmission |
|---|---|
| — | TCI-State3 |

The bit corresponding to the first information field is '0', and the bit corresponding to the second information field is '1', indicating that only the second information field is valid. As such, the beam corresponding to TCI-State3 is used for uplink transmission.

For a state group 3, the information field corresponding to the state group 2 is expressed as the following.

| Only for downlink transmission or uplink and downlink combination transmission | Only for uplink transmission |
|---|---|
| TCI-State5 | — |

The bit corresponding to the first information field is '1', and the bit corresponding to the second information field is '0', indicating that only the first information field is valid. An information field usage indication bit is indicated as '1', indicating that this information field is only used for downlink transmission. As such, the beam corresponding to TCI-State5 is used for downlink transmission.

The base station transmits the DCI signaling to the terminal, and the DCI signaling includes a 3-bit TCI field. A value of each set of 3 bits corresponds to a code point, and this code point corresponds to a state group. For example, if the TCI field of the DCI has a value of '010', the code point corresponds to state group 3. According to the information of the above state group 3, the base station uses the beam of TCI-State5 for downlink transmission.

Example 2

It is assumed that the base station configures a TCI state pool including S=128 TCI-States for the UE. Each state is indicated by a TCI-StateId. For example, a first TCI state is indicated by TCI-State0, a second TCI state is indicated by TCI-State1, and so on. For a multi-TRP scenario, multiple TRPs can transmit data to the same terminal. FIG. 3 is a schematic diagram for a multi-transmission reception point (TRP) transmission scenario according to an embodiment of the present application. It is assumed below that the system supports 2 TRP transmissions.

The gNB transmits MAC-CE signaling to the UE, and the MAC-CE signaling is used to activate N=8 states. For each state group, the following basic information fields are included.

| Only for TRP0 downlink transmission or TRP0 uplink and downlink combination transmission | Only for TRP0 uplink transmission | Only for TRP1 downlink transmission or TRP1 uplink and downlink combination transmission | Only for TRP1 uplink transmission |
|---|---|---|---|
| TCI-StateId | TCI-StateId | TCI-StateId | TCI-StateId |

For each information field, 1 bit information is used to indicate whether the information field exists or is valid. Further, in case that only the first information field and/or the third information field exists, an additional 1-bit information field usage indication is used respectively to distinguish the usage of the first information field and/or the third information field, that is, whether they are only used for downlink transmission or uplink and downlink combination transmission.

For example, for a state group 1, the information field corresponding to the state group 1 is expressed as:

| Only for TRP0 downlink transmission or TRP0 uplink and downlink combination transmission | Only for TRP0 uplink transmission | Only for TRP1 downlink transmission or TRP1 uplink and downlink combination transmission | Only for TRP1 uplink transmission |
|---|---|---|---|
| TCI-State2 | TCI-State6 | — | — |

The bits corresponding to the four information fields are respectively set to "1", "1", '0', '0', indicating that the first and second information fields are valid, and the third and fourth information fields take no effects. As such, this state group indicates that TRP0 performs downlink transmission using the beam indicated by TCI-State2, and the UE performs uplink transmission using the beam indicated by TCI-State6.

For a state group 2, the information field corresponding to the state group 2 is expressed as:

| Only for TRP0 downlink transmission or TRP0 uplink and downlink combination transmission | Only for TRP0 uplink transmission | Only for TRP1 downlink transmission or TRP1 uplink and downlink combination transmission | Only for TRP1 uplink transmission |
|---|---|---|---|
| TCI-State17 | — | — | TCI-State30 |

The bits corresponding to the four information fields are respectively set to '1', '0', '0', '1', indicating that the first and fourth information fields are valid, and the second and third information fields take no effects. Further, the information field usage indication of the first information field is set to '1', indicating that the usage of this information field is uplink and downlink combination transmission for TRP0. As such, this state group indicates that the beam indicated by TCI-State17 is used for uplink and downlink transmission between TRP0 and the terminal, and the beam indicated by TCI-State30 is used for uplink transmission between TRP1 and the terminal.

The base station transmits the DCI signaling to the terminal, and the DCI signaling includes a 3-bit TCI field. A value of each set of 3 bits corresponds to a code point, and this code point corresponds to a state group. For example, if the TCI field of the DCI has a value of "001", the code point corresponds to state group 2. According to information of the above state group 2, the beam indicated by TCI-State17 is used for uplink and downlink transmission between TRP0 and the terminal, and the beam indicated by TCI-State30 is used for uplink transmission between TRP1 and the terminal.

Example 3

It is assumed that the base station configures a TCI pool including S=128 TCI-States for the UE. Each state is indicated by a TCI-StateId. For example, a first TCI state is indicated by TCI-State0, a second TCI state is indicated by TCI-State1, and so on.

The base station transmits MAC-CE signaling to the terminal, and the MAC-CE signaling is used to activate N=8 states (it can be understood as 8 state groups are activated, and each state group includes only one state). For each TCI state indicating uplink transmission, a power control parameter corresponding to each TCI state is configured. For example, the MAC-CE activates the following 8 TCI states, where TCI-State9 indicates beams for uplink and downlink transmissions, TCI-State7 indicates beams for uplink transmission, and the remaining TCI states are used to indicate beams for downlink transmission. As such, uplink power control parameters need to be configured for TCI-State9 and TCI-State7.

| Code points | Activated TCI states | Uplink power control parameters |
|---|---|---|
| 000 | TCI-State3 | — |
| 001 | TCI-State9 | Path loss reference signal: CSI-RS resource 0<br>Closedloop index: i0<br>(Target received power P0, path loss compensation factor alpha): (15, 0.4) |

| Code points | Activated TCI states | Uplink power control parameters |
|---|---|---|
| 010 | TCI-State18 | — |
| 011 | TCI-State25 | — |
| 100 | TCI-State36 | — |
| 101 | TCI-State7 | Path loss reference signal: CSI-RS resource 3<br>Closedloop index: i1<br>(Target received power P0, path loss compensation factor alpha): (2, 0.6) |
| 110 | TCI-State100 | — |
| 111 | TCI-State88 | — |

Further, the MAC-CE may also indicate that the TCI states corresponding to the eight code points can be used for a carrier set {CC1, CC2, CC3}, where CC1 indicates carrier 1, CC2 indicates carrier 2, and CC3 indicates carrier 3. In an embodiment, the MAC-CE indicates that the TCI states corresponding to the eight codebooks can be used for carrier set 1. The carrier set 1 includes carriers {CC1, CC2, CC3}.

Further, the MAC-CE may also indicate that the TCI states corresponding to the eight code points shown can be used in CORESET set 1 or CORESET set 2. The CORESET set 1 includes {CORESET0, CORESET1, CORESET2}, and the CORESET set 2 includes {CORESET3, CORE-SET4}. The CORESET sets are configured by radio resource control (RRC). In an embodiment, the channel indication information field may use 2 bits, and each bit corresponds to CORESET set 1 and CORESET set 2, respectively. The field is '0,1' indicating that the TCI state is for CORESET set 2, and this field is '1,0' indicating that the TCI state is for CORESET set 1.

Similarly, the channel indication information field may also use 5 bits, and each bit corresponds to a CORESET, indicating that the TCI state is used for the CORESET.

The base station transmits the DCI signaling to the terminal, and the DCI signaling includes a 3-bit TCI field. A value of each set of 3 bits corresponds to a code point, and this code point corresponds to a state. For example, if the TCI field of the DCI has a value of '001', the code point corresponds to TCI-State9. The beams for downlink transmission are the beam corresponding to TCI-State9, and beams for the uplink transmission are the beam corresponding to TCI-State9 and uses the corresponding uplink power control parameters for uplink transmission.

In an embodiment, the uplink power control parameters may also be configured separately for different uplink channels. As shown in the table below, some parameters in the uplink power control parameters are configured corresponding to the PUSCH channel, PUCCH channel and SRS respectively.

| Code points | Activated TCI states | Uplink power control parameters |
|---|---|---|
| 000 | TCI-State3 | — |
| 001 | TCI-State9 | Path loss reference signal: CSI-RS resource 0<br>PUSCH channel:<br>Closedloop index: i0<br>(Target received power P0, path loss compensation factor alpha): (15, 0.4)<br>PUCCH channel:<br>Closedloop index: i1<br>Target received power P0, path loss compensation factor alpha): (12, 0.5)<br>SRS: |

-continued

| Code points | Activated TCI states | Uplink power control parameters |
|---|---|---|
| | | Closedloop index: i1 (Target received power P0, path loss compensation factor alpha): (9, 0.9) |
| 010 | TCI-State18 | — |
| 011 | TCI-State25 | — |
| 100 | TCI-State36 | — |
| 101 | TCI-State7 | Path loss reference signal: CSI-RS resource 3 PUSCH channel: Closedloop index: i0 (Target received power P0, path loss compensation factor alpha): (−6, 0.2) PUCCH channel: Closedloop index: i1 (Target received power P0, path loss compensation factor alpha): (0, 0.6) SRS: Closedloop index: i1 (Target received power P0, path loss compensation factor alpha): (−11, 0.9) |
| 110 | TCI-State100 | — |
| 111 | TCI-State88 | — |

Further, the MAC-CE may also indicate that the TCI states corresponding to the eight code points can be used for a carrier set {CC1, CC2, CC3}, where CC1 indicates carrier 1, CC2 indicates carrier 2, and CC3 indicates carrier 3. In an embodiment, the MAC-CE indicates that the TCI states corresponding to the eight codebooks can be used for carrier set 1. The carrier set 1 includes carriers {CC1, CC2, CC3}.

Further, the MAC-CE may also indicate that the TCI states corresponding to the eight code points shown can be used in CORESET set 1 or CORESET set 2. The CORESET set 1 includes {CORESET0, CORESET1, CORESET2}, and the CORESET set 2 includes {CORESET3, CORE-SET4}. The CORESET sets are configured by radio resource control (RRC). In an embodiment, the channel indication information field may use 2 bits, and each bit corresponds to CORESET set 1 and CORESET set 2, respectively. The field is '0,1' indicating that the TCI state is for CORESET set 2, and this field is '1,0' indicating that the TCI state is for CORESET set 1.

Similarly, the channel indication information field may also use 5 bits, and each bit corresponds to a CORESET, indicating that the TCI state is used for the CORESET.

Example 4

It is assumed that the base station configures a TCI state pool including S=128 TCI-States for the UE. Each state is indicated by a TCI-StateId. For example, a first TCI state is indicated by TCI-State0, a second TCI state is indicated by TCI-State1, and so on.

The gNB transmits MAC-CE signaling to the UE, and MAC-CE signaling is used to activate N=8 states. For each state group, the following information fields are included

| For downlink transmission | Only for uplink transmission | Uplink and downlink shared state or uplink and downlink separated state |
|---|---|---|
| TCI-StateId | TCI-StateId | 1/0 |

As such, for each state group, a 1-bit information field usage indication is used to distinguish the state is whether an uplink and downlink shared state or an uplink and downlink separated state.

For example, for a state group 1, the information field corresponding to the state group 1 is expressed as the following.

| For downlink transmission | Only for uplink transmission | Uplink and downlink common ('0') or uplink and downlink separately-used ('1') |
|---|---|---|
| TCI-State0 | TCI-State6 | 1 |

As such, according to the state '1' of the third field, it means that this state group indicates that the beam corresponding to TCI-State0 is used for downlink transmission, and the beam corresponding to TCI-State6 is used for uplink transmission.

For a state group 3, the information field corresponding to the state group 2 is expressed as the following.

| For downlink transmission | Only for uplink transmission | Uplink and downlink common ('0') or uplink and downlink separately-used ('1') |
|---|---|---|
| TCI-State5 | — | 0 |

As such, according to the state '0' of the third field, the state group indicates that beams corresponding to TCI-State5 are used for both uplink and downlink transmissions. According to the state '0' of the third field, the state group indicates that beams corresponding to TCI-State5 are only used for downlink transmission.

Example 5

It is assumed that the base station configures a TCI state pool including S=128 TCI-States for the UE. Each state is indicated by a TCI-StateId. For example, a first TCI state is indicated by TCI-State0, a second TCI state is indicated by TCI-State1, and so on.

The gNB transmits MAC-CE signaling to the UE, and the MAC-CE signaling is used to activate N=8 states, for each state group, the following information fields are included.

| For downlink transmission | Only for uplink transmission |
|---|---|
| TCI-StateId | TCI-StateId |

The MAC-CE signaling includes one independent information field, which is used to indicate all activated state groups (N=8) belong to whether the uplink and downlink shared state or the uplink and downlink separated state, as follows.

| Uplink and downlink common ('0') or uplink and downlink separately-used ('1') |
|---|
| 1/0 |

For example, when the independent information field is configured as 0, it means that all activated N=8 state groups are uplink and downlink shared states. All activated 8 state groups, only the first field is valid.

For a state group 1, the information field corresponding to the state group 1 is expressed as the following.

19        20

| For downlink transmission | Only for uplink transmission |
| --- | --- |
| TCI-State0 | — |

As such, the beam corresponding to TCI-State0 is used for both uplink and downlink transmissions.

For a state group 3, the information field corresponding to the state group 2 is expressed as the following.

| For downlink transmission | Only for uplink transmission |
| --- | --- |
| TCI-State5 | — |

As such, the beam corresponding to TCI-State5 is used for both uplink and downlink transmissions.

When the independent information field is configured as 1, it means that all activated N=8 state groups are uplink and downlink separated states. All activated 8 state groups, two fields are valid.

For a state group 1, the information field corresponding to the state group 1 is expressed as the following.

| For downlink transmission | Only for uplink transmission |
| --- | --- |
| TCI-State0 | TCI-State6 |

As such, the state group indicates that the beam corresponding to TCI-State0 is used for downlink transmission, and the beam corresponding to TCI-State6 is used for uplink transmission.

Other state groups are similar.

FIG. 4 is a schematic structural diagram of a user equipment (UE) according to an embodiment of the present application. As shown in FIG. 4, the user equipment 400 includes a memory 401, a transceiver 403, and a processor 401, and the processor 401 and the memory 402 may also be arranged physically separately.

The memory 402 is used to store computer programs; the transceiver 403 is used to transmit and receive data under the control of the processor 401.

The transceiver 403 is used to receive and send data under the control of the processor 401.

In FIG. 4, a bus system 404 may include any number of interconnected buses and bridges, which are linked together through various circuits of one or more processors represented by processor 401 and one or more memories represented by the memory 402. The bus system can also link together various other circuits, such as peripherals, voltage regulators, and power management circuits, which are well known in the art, and therefore will not be further described in the present application. The bus interface provides an interface. Transceiver 403 may be multiple elements, i.e., including a transmitter and a receiver, units for providing communication with various other devices over transmission media including wireless channels, wired channels, fiber optic cables, and the like. For different user equipment, the user interface 405 may also be an interface for externally or internally connecting the required equipment, and the connected equipment includes, but not limited to, a keypad, a display, a speaker, a microphone, a joystick, and the like.

The processor 401 is responsible for managing the bus system and general processing, and the memory 402 can store data used by the processor 401 when performing operations.

The processor 401 may be a central processing unit (CPU), an application specific integrated circuit (ASIC), a field-programmable gate array (FPGA), or a complex programmable logic device (CPLD), the processor can also use a multi-core architecture.

The processor 401 is configured to perform any one of the methods of the embodiments of the present application when executing the executable instructions by calling the computer program stored in the memory 402. The method includes:

receiving downlink control information, determining a target transmission configuration indicator (TCI) state group based on the downlink control information, where the target TCI state group is used to characterize an applied channel and/or link; and performing signal transmission and reception based on beams corresponding to the target TCI state group.

In an embodiment, the determining the TCI state group based on the downlink control information, where the target TCI state group is used to characterize an applied channel and/or link, includes:

determining a target TCI state group based on the downlink control information, where the target TCI state group includes at least one information field, and the information field includes an uplink beam indication information field, a downlink beam indication information field, and an uplink and downlink shared beam indication information field, an uplink power control information field, a carrier set information field, and a channel indication information field; the uplink power control information field is used to indicate an uplink power control parameter or a parameter set corresponding to the TCI state for uplink transmission, where the carrier set information field is used to indicate one or more carriers applied by the TCI state group; and the channel indication information field is used to indicate one or more channels applied by the TCI state group.

In an embodiment, the information field further includes: a transmission reception point (TRP) indication information field, In an embodiment, the target TCI state group further includes cell ID information.

In an embodiment, before receiving the downlink control information, the operations further include:

receiving a control signaling transmitted from a network device, where the control signaling is used to activate at least one TCI state group, and the at least one activated TCI state group includes the target TCI state group.

In an embodiment, the control signaling further includes: information for indicating whether an information field included in each of the at least one activated TCI state group is valid.

In an embodiment, the control signaling further includes: indication formation for information field usage indicator included in each of the at least one activated TCI state group is valid.

In an embodiment, the indication formation for information field usage indicator is independent information field usage indication information associated with each activated TCI state group, or all activated TCI state groups are associated with the same information field usage indication information.

In an embodiment, the indication formation for information field usage indicator is used to indicate the uplink and downlink shared state or the uplink and downlink separated state. In an embodiment, the determining the TCI state group based on the downlink control information, where the target TCI state group is used to characterize an applied channel and/or link, includes:

determining a target transmission configuration indicator (TCI) state group based on the downlink control information and a predefined relationship, where the predefined relationship is a correspondence relationship between at least one TCI state group and a channel and/or link predetermined by a system.

In an embodiment, before receiving the downlink control information, the operations further include:

receiving a control signaling transmitted from a network device, where the control signaling is used to activate at least one TCI state group, and the at least one activated TCI state group includes the target TCI state group.

In an embodiment, the downlink control information is DCI signaling; a code point indicated by the DCI signaling corresponds to the target TCI state group included in at least one TCI state group activated by the control signaling.

It should be noted here that the above-mentioned apparatus according to the embodiments of the present application can implement all the method steps implemented by the above-mentioned method embodiments, and can achieve the same effect. The same parts and beneficial effects as the same method embodiments will not be repeated here.

In the user equipment according to the embodiments of the present application, by introducing identification or indication information of the channel and/or link into the TCI state group, channels and/or links applied by the TCI state group corresponding to each code point are determined, beam information is further indicated through code points based on downlink control information to be applicable to various application scenarios and utilization rate of resources is improved.

FIG. 5 is a schematic structural diagram of a network device according to an embodiment of the present application. As shown in FIG. 5, the network device 500 includes a memory 502, a transceiver 503, and a processor 501, and the processor 501 and the memory 502 may also be arranged physically separately.

The memory 502 is used to store computer programs; the transceiver 503 is used to transmit and receive data under the control of the processor 501.

In FIG. 5, a bus system 504 may include any number of interconnected buses and bridges, which are linked together through various circuits of one or more processors represented by processor 501 and one or more memories represented by the memory 502. The bus system 504 can also link together various other circuits, such as peripherals, voltage regulators, and power management circuits, which are well known in the art, and therefore will not be further described in the present application. The bus interface provides an interface. Transceiver 503 may be multiple elements, i.e., including a transmitter and a receiver, units for providing communication with various other devices over transmission media including wireless channels, wired channels, fiber optic cables, and the like. The processor 501 is responsible for managing the bus system and general processing, and the memory 502 can store data used by the processor 501 when performing operations.

The processor 501 may be a central processing unit (CPU), an application specific integrated circuit (ASIC), a field-programmable gate array (FPGA), or a complex programmable logic device (CPLD), the processor can also use a multi-core architecture.

The processor 501 is configured to perform any one of the methods of the embodiments of the present application when executing the executable instructions by calling the computer program stored in the memory 502. The method includes:

transmitting downlink control information to a user equipment (UE), where the downlink control information is used by the UE for determining a target transmission configuration indicator (TCI) state group, and the target TCI state group is used to characterize an applied channel and/or link; and performing signal transmission and reception based on beams corresponding to the target TCI state group.

In an embodiment, the determining the TCI state group, where the target TCI state group is used to characterize an applied channel and/or link, includes:

determining a target TCI state group based on the downlink control information, where the target TCI state group includes at least one information field, and the information field includes an uplink beam indication information field, a downlink beam indication information field, and an uplink and downlink shared beam indication information field, an uplink power control information field, a carrier set information field, and a channel indication information field; the uplink power control information field is used to indicate an uplink power control parameter or a parameter set corresponding to the TCI state for uplink transmission; the carrier set information field is used to indicate one or more carriers applied by the TCI state group; and the channel indication information field is used to indicate one or more channels applied by the TCI state group.

In an embodiment, the information field further includes: a transmission reception point (TRP) indication information field, In an embodiment, the target TCI state group further includes cell ID information.

In an embodiment, before transmitting the downlink control information to the user equipment (UE), the operation further includes:

transmitting a control signaling to the UE, where the control signaling is used to activate at least one TCI state group, and the at least one activated TCI state group includes the target TCI state group.

In an embodiment, the control signaling further includes: information for indicating whether an information field included in each of the at least one activated TCI state group is valid.

In an embodiment, the control signaling further includes: indication formation for information field usage indicator included in each of the at least one activated TCI state group is valid.

In an embodiment, the indication formation for information field usage indicator is independent information field usage indication information associated with each activated TCI state group, or all activated TCI state groups are associated with the same information field usage indication information.

In an embodiment, the indication formation for information field usage indicator is used to indicate the uplink and downlink shared state or the uplink and downlink separated state.

In an embodiment, the determining the TCI state group, where the target TCI state group is used to characterize an applied channel and/or link, includes:

determining a target transmission configuration indicator (TCI) state group based on the downlink control information and a predefined relationship, where the predefined relationship is a correspondence relationship between at least one TCI state group and a channel and/or link predetermined by a system.

In an embodiment, before receiving the downlink control information, the operations further include:

transmitting a control signaling to the UE, where the control signaling is used to activate at least one TCI state group, and the at least one activated TCI state group includes the target TCI state group.

In an embodiment, the downlink control information is DCI signaling; a code point indicated by the DCI signaling corresponds to the target TCI state group included in at least one TCI state group activated by the control signaling.

It should be noted here that the above-mentioned apparatus according to the embodiments of the present application can implement all the method steps implemented by the above-mentioned method embodiments, and can achieve the same effect. The same parts and beneficial effects as the same method embodiments will not be repeated here.

FIG. 6 is a first schematic structural diagram of a beam indication device according to an embodiment of the present application. As shown in FIG. 6, the device can be applied in a user equipment (UE), and the beam indication device includes:

a receiving device 601, used to receive downlink control information, determine a target transmission configuration indicator (TCI) state group based on the downlink control information, where the target TCI state group is used to characterize an applied channel and/or link; and a first processing device 602, used to perform signal transmission and reception based on beams corresponding to the target TCI state group.

In an embodiment, the receiving device 601 is used to determine a target TCI state group based on the downlink control information; where the target TCI state group includes at least one information field, and the information field includes an uplink beam indication information field, a downlink beam indication information field, and an uplink and downlink shared beam indication information field, an uplink power control information field, a carrier set information field, and a channel indication information field; the uplink power control information field is used to indicate an uplink power control parameter or a parameter set corresponding to the TCI state for uplink transmission; the carrier set information field is used to indicate one or more carriers applied by the TCI state group; and the channel indication information field is used to indicate one or more channels applied by the TCI state group.

In an embodiment, the information field further includes: a transmission reception point (TRP) indication information field, In an embodiment, the target TCI state group further includes cell ID information.

In an embodiment, before receiving the downlink control information, the receiving device 601 is further used to:

receive a control signaling transmitted from a network device, where the control signaling is used to activate at least one TCI state group, and the at least one activated TCI state group includes the target TCI state group.

In an embodiment, the control signaling further includes: information for indicating whether an information field included in each of the at least one activated TCI state group is valid.

In an embodiment, the control signaling further includes: indication formation for information field usage indicator included in each of the at least one activated TCI state group is valid.

In an embodiment, the indication formation for information field usage indicator is independent information field usage indication information associated with each activated TCI state group, or all activated TCI state groups are associated with the same information field usage indication information.

In an embodiment, the indication formation for information field usage indicator is used to indicate the uplink and downlink shared state or the uplink and downlink separated state.

In an embodiment, the receiving device 601 is used to determine a target transmission configuration indicator (TCI) state group based on the downlink control information and a predefined relationship, where the predefined relationship is a correspondence relationship between at least one TCI state group and a channel and/or link predetermined by a system.

In an embodiment, before receiving the downlink control information, the receiving device 601 is further used to:

receive a control signaling transmitted from a network device, where the control signaling is used to activate at least one TCI state group, and the at least one activated TCI state group includes the target TCI state group.

In an embodiment, the downlink control information is DCI signaling; a code point indicated by the DCI signaling corresponds to the target TCI state group included in at least one TCI state group activated by the control signaling.

FIG. 7 is a second schematic structural diagram of a beam indication device according to an embodiment of the present application. As shown in FIG. 7, the device can be applied in a network device, and the beam indication device includes:

a transmitting device 701, used to transmit downlink control information to a user equipment (UE), where the downlink control information is used by the UE for determining a target transmission configuration indicator (TCI) state group, and the target TCI state group is used to characterize an applied channel and/or link; and a second processing device 702, used to perform signal transmission and reception based on beams corresponding to the target TCI state group.

In an embodiment, the transmitting device 701 is used to determine a target TCI state group based on the downlink control information; where the target TCI state group includes at least one information field, and the information field includes an uplink beam indication information field, a downlink beam indication information field, and an uplink and downlink shared beam indication information field, an uplink power control information field, a carrier set information field, and a channel indication information field; the uplink power control information field is used to indicate an uplink power control parameter or a parameter set corresponding to the TCI state for uplink transmission; the carrier set information field is used to indicate one or more carriers applied by the TCI state group; and the channel indication information field is used to indicate one or more channels applied by the TCI state group.

In an embodiment, the information field further includes: a transmission reception point (TRP) indication information field, In an embodiment, the target TCI state group further includes cell ID information.

In an embodiment, the transmitting device 701 is further used to transmit a control signaling to the UE, where the control signaling is used to activate at least one TCI state group, and the at least one activated TCI state group includes the target TCI state group.

In an embodiment, the control signaling further includes: information for indicating whether an information field included in each of the at least one activated TCI state group is valid.

In an embodiment, the control signaling further includes: indication formation for information field usage indicator included in each of the at least one activated TCI state group is valid.

In an embodiment, the indication formation for information field usage indicator is independent information field usage indication information associated with each activated TCI state group, or all activated TCI state groups are associated with the same information field usage indication information.

In an embodiment, the indication formation for information field usage indicator is used to indicate the uplink and downlink shared state or the uplink and downlink separated state.

In an embodiment, the transmitting device 701 is used to determine a target transmission configuration indicator (TCI) state group based on the downlink control information and a predefined relationship, where the predefined relationship is a correspondence relationship between at least one TCI state group and a channel and/or link predetermined by a system.

In an embodiment, the transmitting device 701 is further used to transmit a control signaling to the UE, where the control signaling is used to activate at least one TCI state group, and the at least one activated TCI state group includes the target TCI state group.

In an embodiment, the downlink control information is DCI signaling; a code point indicated by the DCI signaling corresponds to the target TCI state group included in at least one TCI state group activated by the control signaling.

It should be noted here that the above-mentioned apparatus according to the embodiments of the present application can implement all the method steps implemented by the above-mentioned method embodiments, and can achieve the same effect. The same parts and beneficial effects as the same method embodiments will not be repeated here.

It should be noted that, the division of units in the embodiments of the present application is schematic, and is only a logical function division, and there may be other division manners in actual implementation. In addition, the functional units in the various embodiments of the present application may be integrated into one processing unit, or each unit may exist alone physically, or two or more units may be integrated into one unit. The above-mentioned integrated unit can be implemented in the form of hardware or software functional unit.

If the integrated unit is implemented in the form of a software functional unit and sold or used as an independent product, it can be stored in a computer readable storage medium. Based on such understanding, the embodiments of the present application in essence or a part of the solutions that contributes to the prior art, or all or part of the solutions, may be embodied in the form of a software product, which is stored in a storage medium, including several instructions to cause a computer device (which may be a personal computer, server, or network device, etc.) or a processor to perform all or part of the steps of the methods described in the respective embodiments of the present application. The storage medium described above includes various media that can store program codes such as U disk, mobile hard disk, read-only memory (ROM), random access memory (RAM), magnetic disk, or a compact disk.

An embodiment of the present application further provides a computer readable storage medium having stored thereon a computer program that cause a processor to perform the steps of the methods described above, which, for example, includes:

receiving downlink control information, determining a target transmission configuration indicator (TCI) state group based on the downlink control information, where the target TCI state group is used to characterize an applied channel and/or link; and performing signal transmission and reception based on beams corresponding to the target TCI state group.

An embodiment of the present application further provides a computer readable storage medium having stored thereon a computer program that cause a processor to perform the steps of the methods described above, which, for example, includes:

transmitting downlink control information to a user equipment (UE), where the downlink control information is used by the UE for determining a target transmission configuration indicator (TCI) state group, and the target TCI state group is used to characterize an applied channel and/or link; and performing signal transmission and reception based on beams corresponding to the target TCI state group.

The computer readable storage medium can be any available medium or data storage device that can be accessed by the computer, including but not limited to, a magnetic storage (e.g., a floppy disk, a hard disk, a magnetic tape, a magneto-optical disk (MO), etc.), optical memory (such as CD, DVD, BD, HVD, etc.), and a semiconductor memory (such as ROM, EPROM, EEPROM, non-volatile memory (NAND FLASH), solid-state drive (SSD)), etc.

Embodiments of the present application may be provided as a method, system, or computer program product. Accordingly, the present application may take the form of an entirely hardware embodiment, an entirely software embodiment, or an embodiment combining software and hardware aspects. Furthermore, the present application may take the form of a computer program product embodied on one or more computer-usable storage media having computer-usable program code embodied therein, including but not limited to disk storage, optical storage, and the like.

The present application is described with reference to flow charts and/or block diagrams of methods, apparatus (systems), and computer program products according to embodiments of the present application. It will be understood that each flow and/or block in the flow charts and/or block diagrams, and combinations thereof can be implemented by computer-executable instructions. These computer-executable instructions may be provided to processors of a general purpose computer, a special purpose computer, an embedded processor or other programmable data processing device to produce a machine and the instructions executed by the processor of the computer or other programmable data processing device form a means for performing the functions specified in one or more flows in a flowchart and/or one or more blocks of a block diagram.

These processor-executable instructions may also be stored in a processor-readable memory for directing a computer or other programmable data processing apparatus to operate in a particular manner, and the instructions stored in the processor-readable memory may result in a manufacture including instruction means, the instruction means can perform the functions specified in one or more flows of the flowchart and/or one or more blocks of the block diagram.

These processor-executable instructions can also be loaded onto a computer or other programmable data processing device to cause a series of operational steps to be performed on the computer or other programmable device to produce a computer-implemented process and instructions performed on the computer or other programmable devices provide steps for performing the functions specified in one or more flows of the flowchart and/or one or more blocks of the block diagram.

What is claimed is:

1. A beam indication method, applied to a user equipment (UE), comprising:
    receiving downlink control information;
    determining a target transmission configuration indicator (TCI) state group based on the downlink control information, wherein at least one information field associated with the target TCI state group is used to characterize an applied channel and/or link of the target TCI state group; and
    performing signal transmission and reception, in the applied channel and/or link based on beams corresponding to the target TCI state group;
    the target TCI state group is associated with at least one information field, and the information field comprises at least one of: an uplink beam indication information field, a downlink beam indication information field, an uplink and downlink shared beam indication information field, an uplink power control information field, a carrier set information field, or a channel indication information field.

2. The method of claim 1, wherein
    the uplink power control information field is used to indicate an uplink power control parameter or a parameter set corresponding to the TCI state for uplink transmission; the carrier set information field is used to indicate one or more carriers applied by the TCI state group; and the channel indication information field is used to indicate one or more channels applied by the TCI state group.

3. The method of claim 2, wherein the information field further comprises a transmission reception point (TRP) indication information field.

4. The method of claim 2, wherein the target TCI state group further comprises cell ID information.

5. The method of claim 2, wherein before receiving the downlink control information, the method further comprises:
    receiving a control signaling transmitted from a network device, wherein the control signaling is used to activate at least one TCI state group, and at least one activated TCI state group comprises the target TCI state group.

6. The method of claim 5, wherein the downlink control information is DCI signaling; a code point indicated by the DCI signaling corresponds to the target TCI state group comprised in at least one TCI state group activated by the control signaling.

7. The method of claim 1, wherein the determining the TCI state group based on the downlink control information, wherein at least one information field associated with the target TCI state group is used to characterize an applied channel and/or link of the target TCI state group, comprises:
    determining a target transmission configuration indicator (TCI) state group based on the downlink control information and a predefined relationship, wherein the predefined relationship is a correspondence relationship between at least one TCI state group and a channel and/or link predetermined by a system.

8. The method of claim 7, wherein before receiving the downlink control information, the method further comprises:
    receiving a control signaling transmitted from a network device, wherein the control signaling is used to activate at least one TCI state group, and at least one activated TCI state group comprises the target TCI state group.

9. A beam indication method, applied to a network device, comprising:
    transmitting downlink control information to a user equipment (UE), wherein the downlink control information is used by the UE for determining a target transmission configuration indicator (TCI) state group, and at least one information field associated with the target TCI state group is used to characterize an applied channel and/or link of the target TCI state group; and
    performing signal transmission and reception, in the applied channel and/or link, based on beams corresponding to the target TCI state group;
    the target TCI state group is associated with at least one information field, and the information field comprises at least one of: an uplink beam indication information field, a downlink beam indication information field, an uplink and downlink shared beam indication information field, an uplink power control information field, a carrier set information field, or a channel indication information field.

10. The method of claim 9, wherein
    the uplink power control information field is used to indicate an uplink power control parameter or a parameter set corresponding to the TCI state for uplink transmission; the carrier set information field is used to indicate one or more carriers applied by the TCI state group; and the channel indication information field is used to indicate one or more channels applied by the TCI state group.

11. The method of claim 10, wherein before transmitting downlink control information to the UE, the method further comprises:
    transmitting a control signaling to the UE, wherein the control signaling is used to activate at least one TCI state group, and the at least one activated TCI state group comprises the target TCI state group.

12. The method of claim 11, wherein the control signaling further comprises information for indicating; whether an information field comprised in each of the at least one activated TCI state group is valid;
    indication formation for information field usage indicator comprised in each of the at least one activated TCI state group.

13. The method of claim 9, wherein the determining the TCI state group, wherein at least one information field associated with the target TCI state group is used to characterize an applied channel and/or link of the target TCI state group, comprises:
    determining a target transmission configuration indicator (TCI) state group based on the downlink control information and a predefined relationship, wherein the predefined relationship is a correspondence relationship between at least one TCI state group and a channel and/or link predetermined by a system.

14. The method of claim 13, wherein before transmitting downlink control information to the UE, the method further comprises:

transmitting a control signaling to the UE, wherein the control signaling is used to activate at least one TCI state group, and the at least one activated TCI state group comprises the target TCI state group.

15. A network device, comprising:

a processor;

a memory for storing a computer program; and a transceiver for transmitting and receiving data under the control of the processor, wherein the computer program, when executed by the processor, causes the processor to perform the method of claim 9.

16. A user equipment (UE), comprising:

a processor;

a memory for storing a computer program; and a transceiver for transmitting and receiving data under the control of the processor, wherein the computer program, when executed by the processor, causes the processor to perform the following operations of:

receiving downlink control information, determining a target transmission configuration indicator (TCI) state group based on the downlink control information, wherein at least one information field associated with the target TCI state group is used to characterize an applied channel and/or link of the target TCI state group; and performing signal transmission and reception, in the applied channel and/or link, based on beams corresponding to the target TCI state group;

the target TCI state group is associated with at least one information field, and the information field comprises at least one of: an uplink beam indication information field, a downlink beam indication information field, an uplink and downlink shared beam indication information field, an uplink power control information field, a carrier set information field, or a channel indication information field.

17. The UE of claim 16, wherein the uplink power control information field is used to indicate an uplink power control parameter or a parameter set corresponding to the TCI state for uplink transmission; the carrier set information field is used to indicate one or more carriers applied by the TCI state group; and the channel indication information field is used to indicate one or more channels applied by the TCI state group.

18. The UE of claim 17, wherein before receiving the downlink control information, the computer program, when executed by the processor, causes the processor to:

receive a control signaling transmitted from a network device, wherein the control signaling is used to activate at least one TCI state group, and the at least one activated TCI state group comprises the target TCI state group.

19. The UE of claim 18, wherein the control signaling further comprises information for indicating whether an information field comprised in each of the at least one activated TCI state group is valid, or indication formation for information field usage indicator comprised in each of the at least one activated TCI state group.

20. The UE of claim 16, wherein the determining the TCI state group based on the downlink control information, wherein at least one information field associated with the target TCI state group is used to characterize an applied channel and/or link of the target TCI state group, comprises:

determining a target transmission configuration indicator (TCI) state group based on the downlink control information and a predefined relationship, wherein the predefined relationship is a correspondence relationship between at least one TCI state group and a channel and/or link predetermined by a system.

* * * * *